May 7, 1957 P. POLIONI 2,791,280
HORSESHOE
Filed May 26, 1952
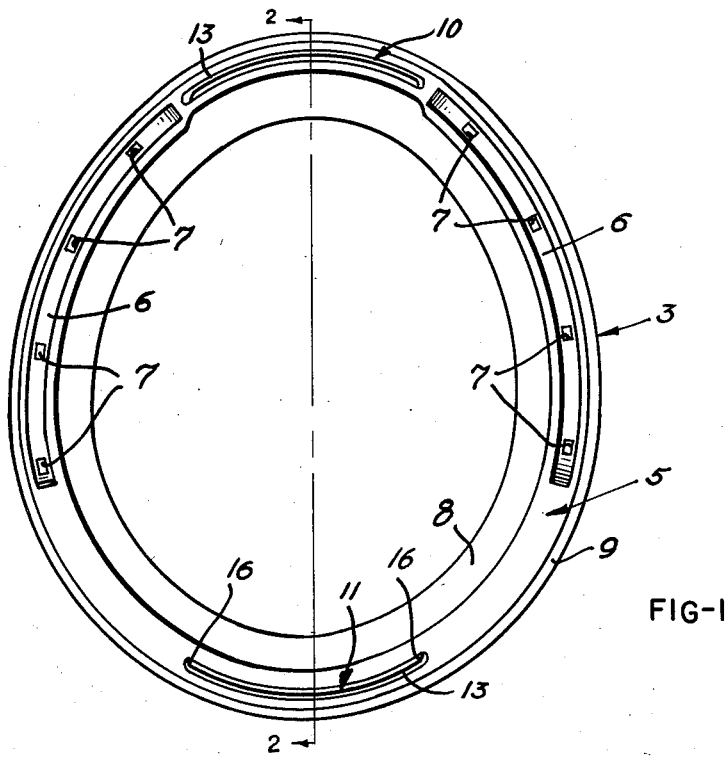
FIG-1
FIG-2
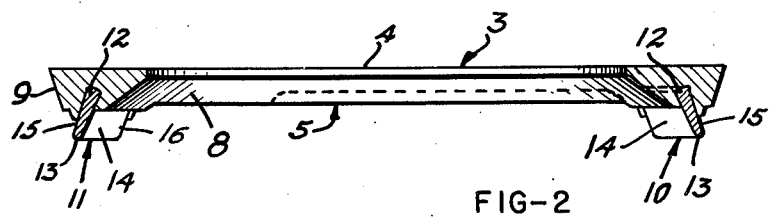
INVENTOR
Paul Polioni
BY
ATTORNEY

United States Patent Office 2,791,280
Patented May 7, 1957

2,791,280

HORSESHOE

Paul Polioni, Spokane, Wash.

Application May 26, 1952, Serial No. 290,020

1 Claim. (Cl. 168—24)

My present invention is a horse shoe of the type adapted to prevent racing horses from running down.

Some race horses have the characteristic of reaching forward with the rear feet to such an extreme that the heel of each rear foot strikes the track and slides forwardly before the toe contacts the track and thus causes the heels to "burn" or rub and when the heels become sensitive, the horse fails to run as well as normal. This over reaching and heel rubbing is known as "running down" or "run down" in the racing vernacular and will be so used herein.

It is therefore a principal object of this invention to provide a racing horse shoe which will correct the tendency of a horse to run down.

Another object of the invention lies in the provision of a rundown horse shoe which has an endless body thus providing protection for the heels of a horse's rear feet.

Another object of the invention lies in the provision of toe and heel calks depending from the run down horse shoe endless body and provides greater traction and less slippage thereby further eliminating the possibility of burning the horse's heels.

Another object of the invention lies in securing the calks to the body at a downward and outward incline thereby causing the shoe to tip down at the front edge in the event the foot slips when contacting the ground.

These and other objects of the invention will become apparent during the course of the following description.

In the accompanying drawing, forming a part of this specification, and in which like numerals are employed to designate like parts.

Figure 1 is a plan view of the bottom or traction side of the horse shoe embodying my invention and showing the front or toe of the shoe at the top of the sheet, and, Figure 2 is a longitudinal cross section of the shoe as at line 2—2 of Figure 1.

Referring now more particularly to the drawing it will be seen that my improved horse shoe indicated in general by the numeral 3 has a flat hoof engaging upper surface 4 and is nearly a true ellipse in plan except that the distance from one focus to its periphery may be greater when found necessary to fit the horse's hoof but is a continuous plane curve without angles or acute distortions.

The bottom or traction side 5 of the shoe has longitudinally extending recesses 6 disposed primarily in the forward or toe quarters of the shoe, and spaced nail admitting apertures 7 are provided in the recesses to assist in securing the shoe to the hoof by means of nails.

Inner and outer walls 8 and 9 converge downwardly and give the shoe roughly a triangular cross section and define the bottom wall 5 of lesser width than top wall 4. The shoe body may be made from any suitable metal. However, a light metal such as aluminum is preferable.

Calks 10 and 11 have their butts 12 imbedded in the body of the shoe and extend downwardly therefrom at an outward incline. Since the calks are wedge-shaped in cross section and the butts are thicker than the exposed tips 13 they are not liable to be accidentally removed from the body of the shoe 3.

The calks 10 and 11 present angular inner and outer faces 14 and 15 and these aid in preventing the horse's running down while racing. A horse having the tendency to run down strikes its heel to the ground first and with my shoe, the rear calk 11 digs in and reduces forward slipping. However, if there be any forward slip, the angular face 14 tends to force the shoe upwardly similar to a common runner and thus eliminates any rubbing to the foot. When the toe calk 10 strikes, the front face 15 digs in and tips the toe down and reduces forward slide as well as tending to lift the rear of the shoe.

As shown the calks are curved longitudinally to the shape of that portion of shoe 3 to which they are secured and these forwardly projecting ends 16 of the heel calk assist in eliminating forward slide by reason that they confine the earth from slipping by the calk. The calks wil preferably be formed of a hard metal for withstanding wear, such as steel, but any material found suitable may be used therefor.

Having thus described my invention, I claim:

As an article of manufacture, a rundown horse shoe having an endless elliptical body having a continuous plane curve free from abrupt distortions and of lightweight metal, a flat hoof-engaging surface on the upper side of said body, downwardly converging straight inner and outer walls on the body defining a substantially triangular cross sectional shape, a relatively narrow bottom wall on the body; said body having nail apertures in its toe quarters for receiving nails to secure the shoe, and longitudinally arcuate toe and heel calks defined from the foci of said elliptical body carried by the body and depending therefrom at outward inclines; said calks being disposed opposed to each other on the longitudinal axis of the shoe and wedge shaped in cross sections and having their butt ends imbedded in the body of the shoe.

References Cited in the file of this patent

UNITED STATES PATENTS

| | | |
|---|---|---|
| 553,586 | Kent | Jan. 28, 1896 |
| 666,304 | Covey | Jan. 22, 1901 |
| 722,610 | McKay | Mar. 10, 1903 |
| 803,985 | Campbell | Nov. 7, 1905 |
| 895,367 | Harden | Aug. 4, 1908 |
| 1,081,564 | Amoth | Dec. 16, 1913 |
| 1,951,700 | Liepman | Mar. 20, 1934 |
| 2,197,166 | Wheeler et al. | Apr. 16, 1940 |

FOREIGN PATENTS

| | | |
|---|---|---|
| 155,870 | Great Britain | Jan. 6, 1921 |